(12) United States Patent
Tani

(10) Patent No.: US 7,970,589 B2
(45) Date of Patent: Jun. 28, 2011

(54) APPARATUS AND PROGRAM FOR ANALYZING ELECTROMAGNETIC FIELD

(75) Inventor: Takeharu Tani, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 658 days.

(21) Appl. No.: 12/025,796

(22) Filed: Feb. 5, 2008

(65) Prior Publication Data

US 2008/0189088 A1    Aug. 7, 2008

(30) Foreign Application Priority Data

Feb. 5, 2007  (JP) ................................ 2007-025056

(51) Int. Cl.
*G06F 17/10*  (2006.01)

(52) U.S. Cl. ............................................. 703/2

(58) Field of Classification Search ...... 703/2; 436/171; 434/278
See application file for complete search history.

(56) References Cited

U.S. PATENT DOCUMENTS

| | | | | |
|---|---|---|---|---|
| 6,665,849 | B2 * | 12/2003 | Meuris et al. ..................... | 716/7 |
| 7,257,518 | B2 * | 8/2007 | Alba ................................. | 703/2 |
| 7,541,818 | B2 * | 6/2009 | Kosaka et al. .................. | 324/750 |
| 7,593,836 | B2 * | 9/2009 | Odajima .......................... | 703/2 |
| 2004/0082074 | A1 * | 4/2004 | McGrath ........................ | 436/171 |
| 2006/0271888 | A1 * | 11/2006 | Meuris et al. ..................... | 716/4 |

FOREIGN PATENT DOCUMENTS

JP    2004-279292 A    10/2004

* cited by examiner

*Primary Examiner* — Russell Frejd
(74) *Attorney, Agent, or Firm* — Sughrue Mion, PLLC

(57) ABSTRACT

In an apparatus for analyzing an electromagnetic field in an analytical space: a range setting unit sets the range of the analytical space; an object-information setting unit sets a distribution-index value indicating the amount of particles distributed in the range, the dimensions of the particles, a first material-property value of a first material of which the particles are formed, and a second material-property value of a second material existing around the particles in the range; a model production unit produces a calculation model of an arrangement in which the particles are arranged at random positions in the range so as to realize the distribution-index value, the dimensions of the particles, the first material-property value, and the second material-property value which are set by the object-information setting unit; and an analysis unit analyzes the electromagnetic field in the range in accordance with the calculation model.

13 Claims, 4 Drawing Sheets

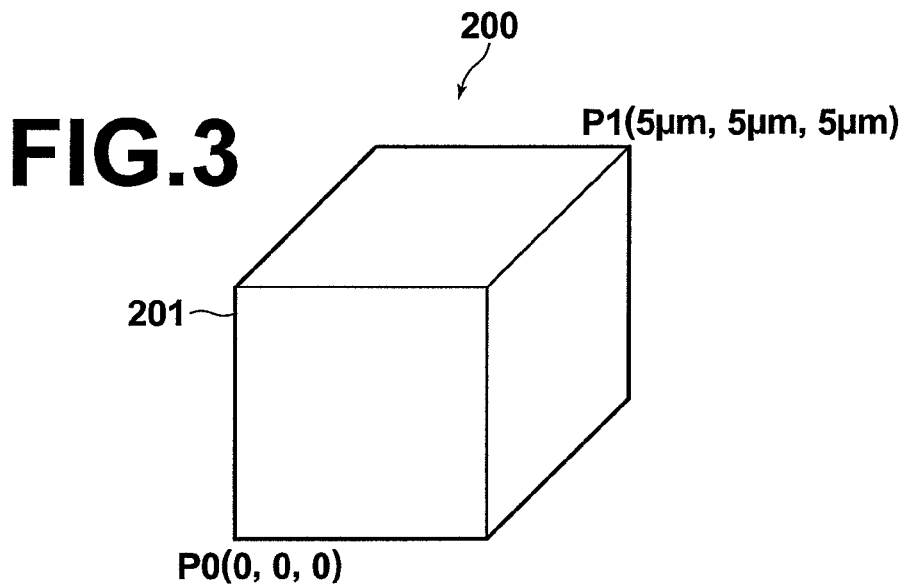
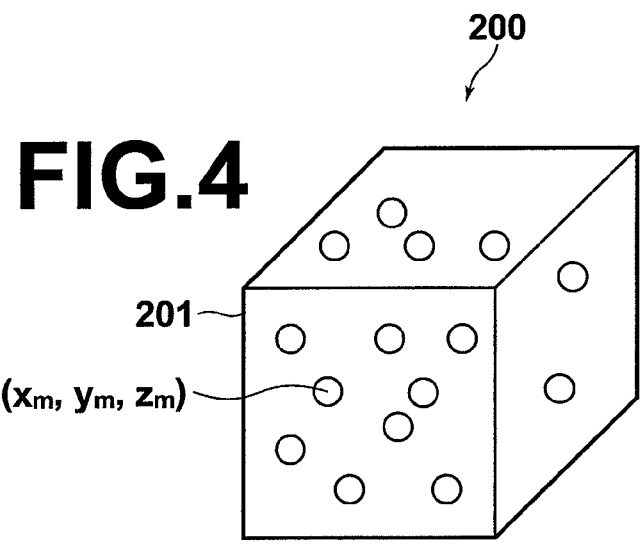
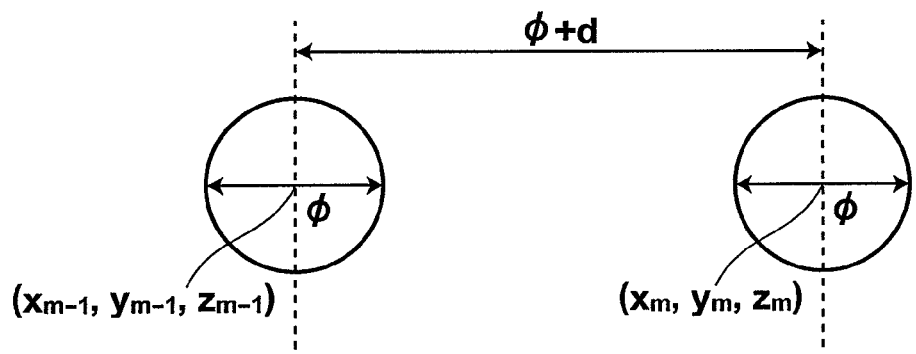

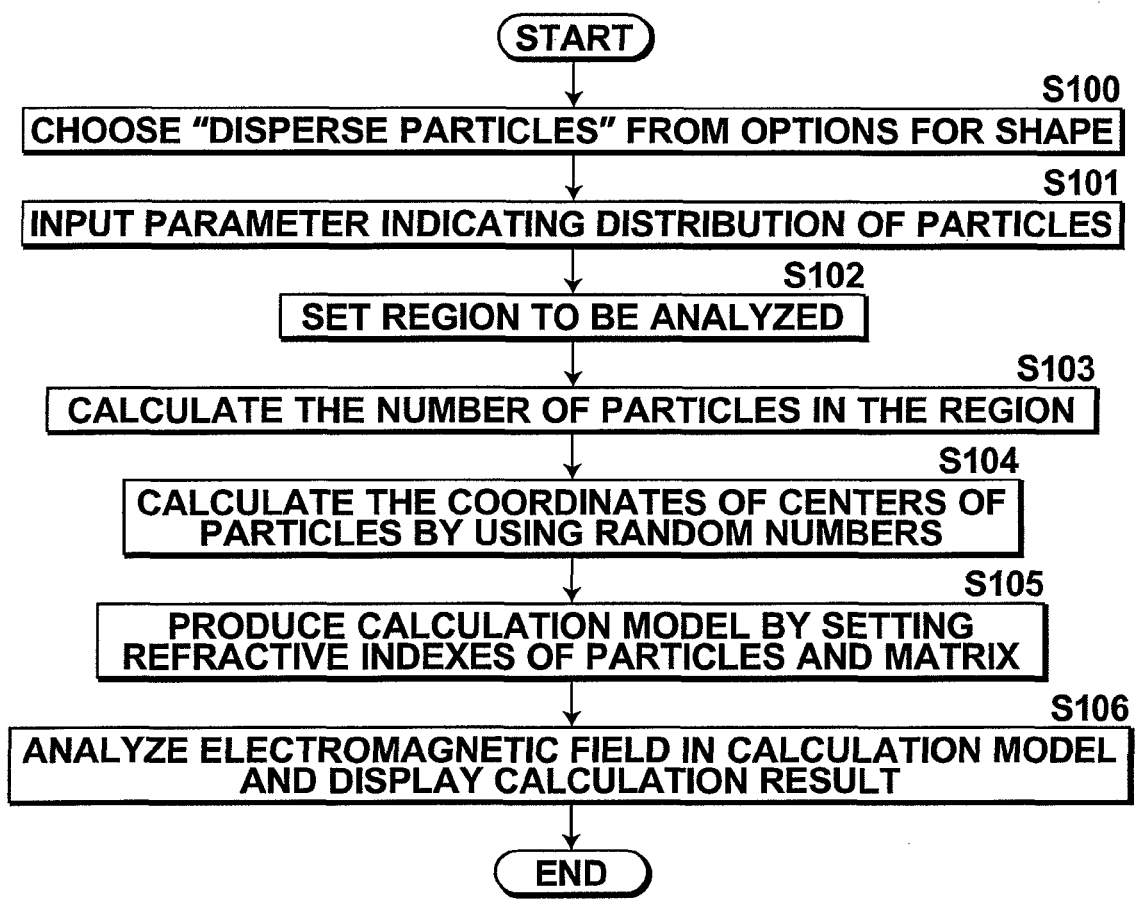

APPARATUS AND PROGRAM FOR ANALYZING ELECTROMAGNETIC FIELD

BACKGROUND OF THE INVENTION

1. Field of the Invention

The present invention relates to an apparatus and a program for analyzing the time and space variations of an electromagnetic field (electromagnetic wave) in an object. In addition, the present invention also relates to a computer-readable medium storing such a program.

2. Description of the Related Art

Conventionally, various techniques including the finite element method are used for numerically analyzing interactions between substances and electromagnetic fields such as light and radio waves. In particular, recently, an analytical technique called FDTD (finite-difference time-domain) has been receiving attention. According to FDTD, the space is discretized into discrete grid points, and the time variations of electric and magnetic fields at the discrete points are analyzed in accordance with the Maxwell equations.

The modeling of objects under analysis in accordance with FDTD has high degree of freedom. However, in order to obtain accurate analytic results, it is necessary to perform the analysis by using a model of an object which is as close as possible to the real object. Conventionally, the shapes of the calculation models have been defined by combining and arranging simple geometrical elements basically including planes, rectangular parallelepipeds, spheres, cylinders, cones, and the like. In practice, the shapes are defined by using CAD (computer-aided design), and material parameters such as the refractive index and the dielectric constant are assigned to the defined shapes.

In order to input as a calculation model having a shape as close as possible to the shape of the actual object by using the above technique, bothersome input operations are required. For example, the bothersome input operations include operations for input of the shape while observing an electronic image or the like and operations for conversion from the scale of the electronic image to the scale of the coordinate system of the analytical space in the simulation. That is, conventionally, much labor is required for setting the calculation model. According to a proposed technique of FDTD analysis, an electronic image obtained by an optical or electron microscope is directly inputted, and material parameters such as the refractive index and the dielectric constant are set according to the concentration at each pixel of the electronic image. (For example, see Japanese Unexamined Patent Publication No. 2004-279292.) According to this technique, it is possible to accurately reflect the shape of the real object in the calculation model without being limited by geometrical elements which are prepared in advance, and reduce the man-hours required for setting the calculation model.

However, the above technique, in which the material parameters are set according to the concentration at each pixel of the electronic image, cannot produce a calculation model of an object in which particles are randomly distributed and which has a complex distribution of the refractive index.

SUMMARY OF THE INVENTION

The present invention has been developed in view of the above circumstances.

The first object of the present invention is to provide an apparatus and a program for analyzing an electromagnetic field in a space in which particles are randomly distributed.

The second object of the present invention is to provide a computer-readable medium storing the above program achieving the first object of the present invention.

In order to accomplish the aforementioned first object, according to the first aspect of the present invention, an apparatus for analyzing an electromagnetic field in an analytical space is provided. The apparatus comprises: a range setting unit for setting the range of the analytical space; an object-information setting unit for setting a distribution-index value indicating the amount of particles distributed in the range, the dimensions of the particles, a first material-property value of a first material of which the particles are formed, and a second material-property value of a second material existing around the particles in the range; a model production unit which produces a calculation model of an arrangement in which the particles are arranged at random positions in the range so as to realize the distribution-index value, the dimensions of the particles, the first material-property value, and the second material-property value which are set by the object-information setting unit; and an analysis unit which analyzes the electromagnetic field in the range in accordance with the calculation model.

In addition, in order to accomplish the aforementioned first object, according to the second aspect of the present invention, a program to be executed by a computer for analyzing an electromagnetic field in an analytical space is provided. The program realizes in the computer: a range setting unit for setting the range of the analytical space; an object-information setting unit for setting a distribution-index value indicating the amount of particles distributed in the range, the dimensions of the particles, a first material-property value of a first material of which the particles are formed, and a second material-property value of a second material existing around the particles in the range; a model production unit which produces a calculation model of an arrangement in which the particles are arranged at random positions in the range so as to realize the distribution-index value, the dimensions of the particles, the first material-property value, and the second material-property value which are set by the object-information setting unit; and an analysis unit which analyzes the electromagnetic field in the range in accordance with the calculation model.

Further, in order to accomplish the aforementioned second object, according to the third aspect of the present invention, a computer-readable medium storing the program according to the second aspect of the present invention is provided.

The apparatus according to the first aspect of the present invention and the program according to the second aspect of the present invention may further have one or any possible combination of the following additional features (i) to (v).

(i) The distribution-index value indicates, for example, the concentration of the particles, the number of the particles contained in a predetermined volume, the volume ratio of the particles, or the like.

(ii) The model production unit may determine the random positions by using values generated on the basis of random numbers.

(iii) The model production unit may include a distance input unit for inputting a reference value for the distances between the particles, and arrange the particles so that at least part of the distances between the particles are increased on the basis of the reference value.

(iv) The model production unit may include a distance input unit for inputting a reference value for the distances between the particles, and arrange the particles so that at least part of the distances between the particles are decreased on the basis of the reference value.

(v) The first material-property value may indicate the refractive index of the first material, and the second material-property value may indicate the refractive index of the second material.

The present invention has the following advantages.

According to the aforementioned conventional technique using CAD, the operator is required to manually arrange a great number of particles in the analytical space on a particle-by-particle basis for producing a calculation model close to the real object. On the other hand, according to the present invention, it is possible to automatically arrange the particles in the analytical space and automatically produce a calculation model of an arrangement in which the particles are distributed, by setting the distribution-index value (indicating the amount of particles distributed in the range), the dimensions of the particles, the first material-property value (of the first material of which the particles are formed), and the second material-property value (of the second material existing around the particles in the range). Therefore, it is possible to arrange the particles in an arrangement close to the real object without bothersome operations, and analyze the electromagnetic field in the analytical space.

In addition, in the case where the model production unit has the distance input unit, and the particles are arranged so that at least part of the distances between the particles are increased on the basis of the information inputted by the model production unit, it is possible to produce a condition in which the particles are relatively sparsely distributed, and analyze the electromagnetic field under such a condition. On the other hand, in the case where the model production unit has the distance input unit, and the particles are arranged so that at least part of the distances between the particles are decreased on the basis of the information inputted by the model production unit, it is possible to produce a condition in which the particles are relatively densely distributed or coagulated, and analyze the electromagnetic field under such a condition.

BRIEF DESCRIPTION OF THE DRAWINGS

FIG. 3 is a diagram illustrating the range to be analyzed.

FIG. 4 is a diagram provided for explaining an arrangement of particles in the range.

FIG. 5 is a diagram provided for explaining an arrangement of particles in accordance with an input of the distance between the particles.

FIG. 6 is a flow diagram indicating a sequence of operations of the electromagnetic analysis apparatus.

DESCRIPTION OF THE PREFERRED EMBODIMENTS

An embodiment of the present invention is explained in detail below with reference to the drawings.
Electromagnetic Analysis Apparatus FIG. 1 is a diagram schematically illustrating an outline of an electromagnetic analysis apparatus according to an embodiment of the present invention.

Figure 1:
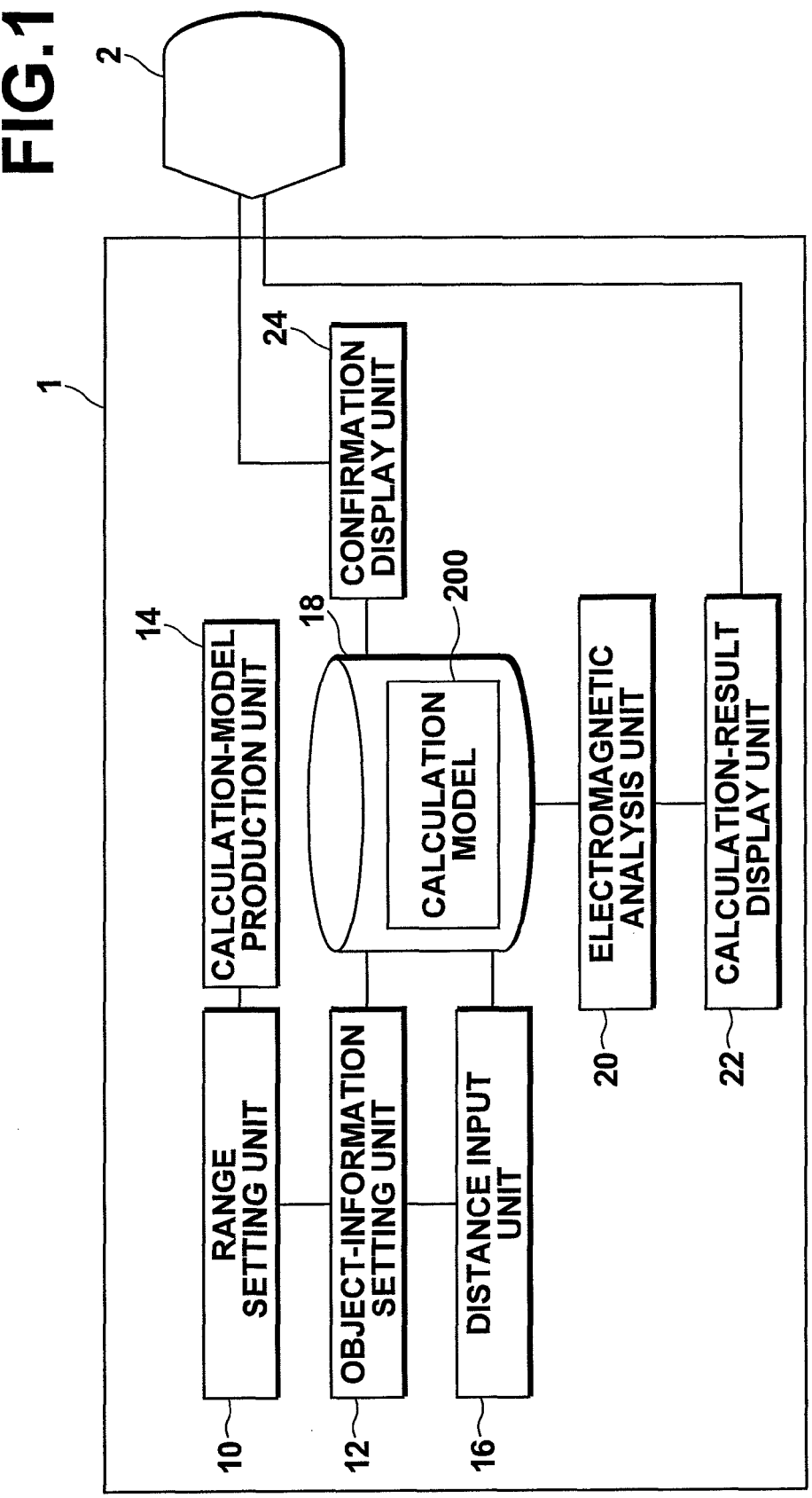
FIG. 1 is a diagram schematically illustrating an outline of an electromagnetic analysis apparatus according to an embodiment of the present invention.

As illustrated in FIG. 1, the electromagnetic analysis apparatus 1 according to the present embodiment comprises a range setting unit 10, an object-information setting unit 12, a calculation-model production unit 14, a distance input unit 16, a calculation-model storing unit 18, an electromagnetic analysis unit 20, a calculation-result display unit 22, and a confirmation display unit 24. In addition, a display device 2 is connected to the electromagnetic analysis apparatus 1. These functions of the electromagnetic analysis apparatus 1 can be realized on a computer (e.g., a personal computer) when the computer executes an electromagnetic analysis program, which is stored in advance in an auxiliary storage (not shown) connected to the computer.

The range setting unit 10 sets the range of the space to be analyzed (analytical space). The object-information setting unit 12 sets a distribution-index value indicating the amount of particles distributed in the range, the dimensions of the particles, the material-property value of a first material of which the particles are formed, and the material-property value of a second material existing around the particles in the range. The calculation-model production unit 14 produces a calculation model 200 of an arrangement in which the particles are arranged at random positions in the range so as to realize the distribution-index value, the dimensions of the particles, and the material-property values of the first and second materials which are set by the object-information setting unit 12. The distance input unit 16 is provided for inputting a reference value for the distances between the particles. The calculation-model storing unit 18 stores the calculation model 200. The electromagnetic analysis unit 20 analyzes the electromagnetic field in the range by using the calculation model 200. The calculation-result display unit 22 makes the display device 2 display a result of calculation performed by the electromagnetic analysis unit 20. The confirmation display unit 24 displays on the display device 2 the state of the particles distributed in the range.

Specifically, the respective units have the following functions.

The range setting unit 10 sets the range of the space to be analyzed (i.e., the analytical space 201). For example, the range setting unit 10 designates as the range of the analytical space 201 the cubic region having opposite points P0 (=(0, 0, 0)) and P1 (=(5, 5, 5)) on a diagonal as illustrated in FIG. 3, where the coordinates are indicated in micrometers, and the cubic region has the volume of 5 μm³.

The object-information setting unit 12 sets a distribution-index value indicating the amount of particles distributed in the analytical space 201, the dimensions of the particles, the material-property value of the first material of which the particles are formed, and the material-property value of the second material existing around the particles in the analytical space 201. Further specifically, the distribution-index value indicates, for example, the concentration of the particles, the number of the particles contained in a predetermined volume, the volume ratio of the particles, or the like. In addition, in many cases, the particles have a spherical shape. However, since the particles can have other shapes, it is preferable that the electromagnetic analysis apparatus can further receive designation of the shape of the particles as "rectangular parallelepiped," "cylinder," "cone," or the like.

The distance input unit 16 receives input of the reference value for the distances between the particles.

The calculation-model production unit 14 produces the calculation model 200 of an arrangement in which the particles (having the shape designated by the object-information setting unit 12) are arranged at random positions in the analytical space 201 so as to realize the distribution-index value, the dimensions of the particles, and the material-property values of the first and second materials which are set by the object-information setting unit 12. The calculation model 200 is a spatial distribution of the material-property values at discrete (grid) points in the analytical space 201, where the arrangement of the particles produces the spatial distribution. The material-property values are the values of a specific property of the material of the particles and the material existing around the particles at the discrete positions. For example, the material-property values indicate the values of the refractive index at the discrete positions. Then, the calculation-model production unit 14 stores the calculation model 200 in the calculation-model storing unit 18.

In the case where a great number of particles are arranged in the analytical space 201 filled with a material different from the particles (e.g., water), numerical input or CAD input of the spatial coordinates of each of the particles requires extremely time-consuming work. In addition, since it is impossible to correctly know the three-dimensional spatial distribution of the particles, it is impossible to set such a model by CAD software. On the other hand, the calculation-model production unit 14 automatically determines and arranges the positions of the particles in the analytical space 201 by using random numbers or the like.

Further, in the case where the particles are arranged at random positions in the analytical space 201, it is possible to produce the calculation model 200 so that the distances between the particles do not fall below a value d inputted through the distance input unit 16 as the reference value for the distances between the particles. In this case, it is possible to produce the calculation model 200 of an arrangement in which the particles are relatively sparsely distributed. Alternatively, it is also possible to produce the calculation model 200 so that the distances between the particles fall below a value d inputted through the distance input unit 16 as the reference value for the distances between the particles. In this case, it is possible to produce the calculation model 200 of an arrangement in which the particles are relatively densely distributed or coagulated.

Figure 2:
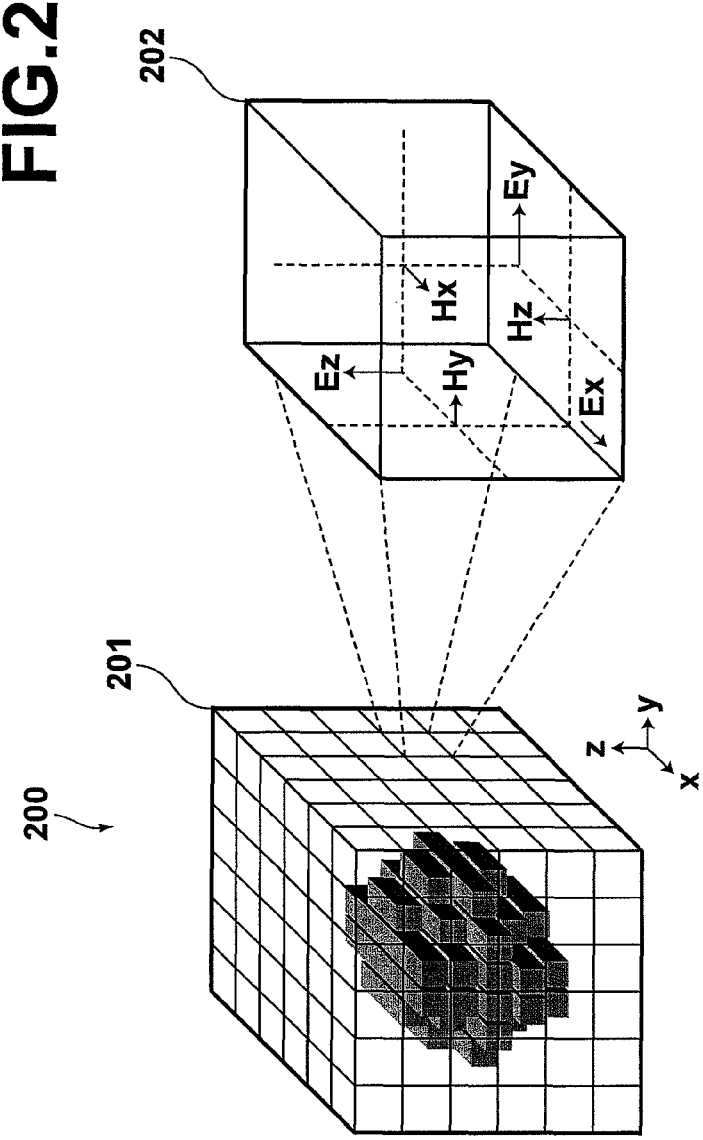
FIG. 2 is a diagram provided for explaining the FDTD technique.

The electromagnetic analysis unit 20 analyzes physical phenomena affecting the electromagnetic field in the analytical space 201 by use of the calculation model 200, and obtains the time and space variations in the electromagnetic field in the analytical space 201. Specifically, it is possible to use an FDTD calculation program which numerically obtains the time and space variations in the electromagnetic field in the analytical space 201 on the basis of the Maxwell equations. According to the FDTD technique, the distribution of the material-property value in the analytical space 201 is discretized into a grid formed with very small rectangular parallelepiped cells (Yee cells) 202 as illustrated in FIG. 2, and the time variations of the electromagnetic field at the grid points are calculated on the basis of the Maxwell equations. As well as FDTD, it is also possible to use one of other calculation techniques (including the finite element method, the boundary element method, and the like) which are widely known.

Further, the electromagnetic analysis unit 20 calculates physical quantities (e.g., the reflectances, transmittances, absorptances, far-field radiation distributions, and the like) according to the purpose of the analysis by using the above calculation techniques. In order to perform the analysis, when necessary, the operator sets conditions necessary for calculation. For example, the conditions include conditions on the analytical region and conditions on an incoming electromagnetic wave. The conditions on the analytical region include the calculation range, the manner of discretizing the space, boundary conditions, and the like, and the conditions on the incoming electromagnetic wave include the spatial distribution, the time variations, the polarization condition, and the like).

The calculation-result display unit 22 has some functions including the function of displaying on the display device 2 a result of calculation obtained by the electromagnetic analysis unit 20.

The confirmation display unit 24 displays on the display device 2 the state of the particles distributed in the analytical space 201 for confirmation by the operator.

Sequence of Operations

Hereinbelow, a sequence of operations of the electromagnetic analysis apparatus 1 is explained with reference to FIGS. 3 to 5 and the flow diagram of FIG. 6. In the following explanations, it is assumed that gold particles are randomly dispersed in water, and the material-property value indicates the refractive index.

First, the operator sets the shape. At this time, the operator chooses one of options for the shape element (e.g., "Rectangular Parallelepiped," "Sphere," "Cylinder," "Cone," "Disperse Particles," and the like) in a screen (not shown) displayed for inputting a calculation model. When the operator sets a calculation model of an arrangement in which particles are dispersed in a predetermined space, the operator chooses the option "Disperse Particles" in the screen (in step S100).

Then, a screen for setting information on the dispersed particles is displayed on the display device 2, and prompts the operator to input parameters. For example, the screen prompts the operator to input the parameters $(x_0, y_0, z_0)$-$(x_1, y_1, z_1)$, n1, n2, $\Phi$, and $\alpha$ for the analytical range, the refractive index of the matrix, the refractive index of particles, the diameter of particles, and the concentration of particles, respectively. In the case where the shape of the particles is not designated, normally the particles are assumed to have a spherical shape, and the size of the particles is set by the diameter of the particles, and the concentration of particles is set as the distribution-index value. Then, the operator inputs the parameters in the screen for setting information on the dispersed particles as follows in step S101.

(1) Analytical Range $(x_0, y_0, z_0)$-$(x_1, y_1, z_1)$ (0, 0, 0)-(5 μm, 5 μm, 5 μm)

(2) Refractive Index of Matrix n1 1.33

(3) Refractive Index of Particles n2 0.47+2.15i (4) Diameter of Particles $\Phi$ 50 nm (5) Concentration of Particles $\alpha$ 0.01

Alternatively, instead of inputting the parameters through the screen on the display device 2, it is possible to input a text file in which values of the above parameters are described in advance.

Next, the range setting unit 10 sets the analytical space 201. In the case where the coordinates $(x_0, y_0, z_0)$=(0, 0, 0) and $(x_1, y_1, z_1)$=(5 μm, 5 μm, 5 μm) of the two points P0 and P1 are inputted, the cubic region having the opposite points P0 and P1 on a diagonal and the volume of 5 μm³ as illustrated in FIG. 3 is set as the analytical space 201 in step S102.

In step S103, the calculation-model production unit 14 calculates the number N of the particles in the analytical space 201 on the basis of the parameters and the analytical space 201 which are set as above, in accordance with the following formula.

$$N = \alpha \times (x_1 - x_0) \times (y_1 - y_0) \times (z_1 - z_0) / \{(4/3)\pi(\phi/2)^3\}$$
$$= 0.01 \times (5\,\mu m)^3 / \{(4/3)\pi \times (0.025\,\mu m)^3\}$$
$$\approx 19{,}099$$

In step S104, the coordinates of the centers of the N particles are determined by using random numbers. The random numbers may be generated by a function of generating random numbers, which is provided, for example, by a program. The coordinates of the centers of the N particles are determined in succession on a particle-by-particle basis from the first particle through the Nth particle by using the equations (1), $$\left.\begin{array}{l} x_m = x_0 + (\text{random\_number}) \times (x_1 - x_0), \\ y_m = y_0 + (\text{random\_number}) \times (y_1 - y_0), \text{ and} \\ z_m = z_0 + (\text{random\_number}) \times (z_1 - z_0), \end{array}\right\} \quad (1)$$

where random_number denotes uniform random numbers (uniformly distributed) in the range of 0 to 1.

Specifically, first, the coordinates $(x_m, y_m, z_m)$ for the center of the mth particle ($1 \leq m \leq N$) are obtained by the equations (1). However, when the coordinates $(x_m, y_m, z_m)$ are once obtained for the center of the mth particle in accordance with the equations (1), the distance from the center of the mth particle based on the obtained coordinates $(x_m, y_m, z_m)$ to the center of each of the first to (m−1)th particles (of which the coordinates of the centers have already been determined) is compared with the diameter $\Phi$ of the particles. When the distance from the center of the mth particle based on the coordinates $(x_m, y_m, z_m)$ obtained from the equations (1) to the center of one of the first to (m−1)th particles fall below the diameter $\Phi$ of the particles, the coordinates $(x_m, y_m, z_m)$ for the center of the mth particle are obtained again by using other random numbers and the equations (1), and the distance from the reobtained center of the mth particle to the center of each of the first to (m−1)th particles (the centers of which have already been determined) is compared with the diameter $\Phi$ of the particles. When the distances from the center of the mth particle based on the coordinates $(x_m, y_m, z_m)$ obtained from the equations (1) to the centers of all of the first to (m−1)th particles does not fall below the diameter $\Phi$ of the particles, the coordinates $(x_m, y_m, z_m)$ obtained by the equations (1) are determined to be the coordinates of the center of the mth particle, so that the volume of the mth particle does not overlap the volumes of the first to (m−1)th particles. When the above operations are performed in succession from the first particle through the Nth particle, the N particles can be arranged in the analytical space 201 so that the volumes of the particles do not overlap each other.

Next, in step S105, the calculation-model production unit 14 produces a calculation model 200 on the basis of the values n1 (=1.33) and n2 (=0.47+2.15i) of the refractive indexes of the matrix and the particles, the diameter $\Phi$ (=50 nm) of the particles, and the coordinates of the centers of the N particles determined in step S104. Specifically, the distribution of the refractive index in the analytical space 201 is calculated on the basis of the coordinates of the centers of the N particles. At this time, it is determined in succession whether or not the coordinates $(x_i, y_j, z_k)$ of each grid point in the analytical space 201 satisfy the inequalities (2) and (3).

$$x_0 < x_i < x_1, y_0 < y_j < y_1, \text{ and } z_0 < z_k < z_1, \quad (2)$$

$$\sqrt{(x_i-x_m)^2+(y_j-y_m)^2+(z_k-z_m)^2} < \Phi/2 \ (m=1 \text{ to } N) \quad (3)$$

When the coordinates $(x_i, y_j, z_k)$ of each grid point satisfy the above inequalities (2) and (3), the calculation-model production unit 14 determines that the refractive index at the grid point is equal to n2. When the coordinates $(x_i, y_j, z_k)$ of each grid point satisfy only the inequalities (2), the calculation-model production unit 14 determines that the refractive index at the grid point is equal to n1. The distribution of the refractive index in the analytical space 201 is obtained by repeating the above operations based on the inequalities (2) and (3). Then, the calculation-model production unit 14 stores in the calculation-model storing unit 18 the calculation model 200 produced as above.

During or after the operation of producing the calculation model 200, the confirmation display unit 24 displays on the display device 2 the state of the distribution of the particles in the calculation model 200.

In step S106, the electromagnetic analysis unit 20 analyzes the electromagnetic field by using the calculation model 200 produced as above, and the calculation-result display unit 22 displays the result of the calculation (analysis) on the display device 2.

Variations

The present invention is not limited to the above embodiment, and various variations can be considered within the scope of the present invention as follows.

(a) Although the diameters of the particles are assumed to be constant in the above embodiment, alternatively, the diameters of the particles may have variations. For example, it is possible to designate as parameters the average diameter $\Phi_{ave}$ of the particles and the variance $\Delta\Phi$ of the diameters of the particles, and produce a calculation model of an arrangement in which the diameters of the particles have variations with the average diameter $\Phi_{ave}$ and the variance $\Delta\Phi$.

In the above case, the number N of the particles in the analytical space can be calculated in accordance with the following formula.

$$N = \alpha \times (x_1-x_0) \times (y_1-y_0) \times (z_1-z_0) / \{(4/3)\pi(\Phi_{ave}/2)^3\}$$

In addition, the values of the diameters of the respective particles, as well as the coordinates of the centers of the particles, are determined by using normally distributed random numbers on a particle-by-particle basis. The normally distributed random numbers are generated by the Box-Muller transform of uniform random numbers. Specifically, the value $\Phi_m$ of the diameter of the mth particle is obtained as $$\Phi_m = \Phi_{ave} + \Delta\Phi \times \sqrt{(-2\ln(p))} \times \sin(2\pi q), \quad (4)$$

where p and q are uniform random numbers in the range of 0 to 1. The uniform random numbers may be generated by the function of generating random numbers provided in the operating system or the like.

Further, when the volume of the particle based on the coordinates of the center and the diameter newly obtained for the particle by the equations (1) and (4) overlaps the volumes of other particles of which the diameters and the coordinates of the centers have already been determined, the coordinates of the center and the diameter for the particle are reobtained by using other uniform and normally distributed random numbers and the equations (1) and (4). When the volume of the particle based on the coordinates of the center and the diameter newly obtained by the equations (1) and (4) does not overlap the volumes of other particles of which the coordinates of the centers and the diameters have already been determined, the coordinates of the center and the diameter obtained by the equations (1) and (4) for the particle are determined to be the coordinates of the center and the diameter of the particle. Then, the distribution of the refractive indexes at the grid points in the analytical space is calculated on the basis of the diameters and the coordinates of the centers of the N particles, so that a calculation model 200 for the FDTD calculation is produced.

(b) It is possible to produce the calculation model 200 of an arrangement in which the particles are distributed in a specific manner.

For example, it is possible to produce the calculation model 200 by the calculation-model production unit 14 so that the distances between the particles do not fall below a value d, which is inputted through the distance input unit 16. In this case, the aforementioned screen for setting information on the dispersed particles may also be arranged to prompt the operator to input the additional parameter d for the interparticle distance. Then, as mentioned before, the coordinates $(x_m, y_m, z_m)$ for the center of the mth particle are randomly obtained. When the distances from the center of the mth particle based on the randomly obtained coordinates $(x_m, y_m, z_m)$ to the centers of one of the first to (m−1)th particles fall below the value $\Phi+d$, the coordinates $(x_m, y_m, z_m)$ of the center and the diameter for the particle are reobtained by using other uniform and normally distributed random numbers and the equations (1) and (4) until the distances from the center of the mth particle based on the randomly obtained coordinates $(x_m, y_m, z_m)$ to the centers of all of the first to (m−1)th particles become equal to or greater than the value $\Phi+d$ (as illustrated in FIG. 5). In this case, when the value d is increased, the particles are more sparsely dispersed in the calculation model 200.

Alternatively, it is possible to produce the calculation model 200 of an arrangement in which the particles are more densely distributed or coagulated to some degree. For example, it is possible to first determine the coordinates of the centers of predetermined part of the particles (e.g., N/2 particles) at random positions, and thereafter determine the coordinates of the centers of the remaining particles at random positions so that the distances from the center of each of the remaining particles to the centers of the other particles is smaller than the value $\Phi+d$ and not smaller than f. In this case, the aforementioned screen for setting information on the dispersed particles may also be arranged to prompt the operator to input the additional parameter d for the interparticle distance. Specifically, the coordinates $(x_m, y_m, z_m)$ for the center of the mth particle (m>N/2) are randomly obtained as mentioned before. When the distances from the center of the mth particle based on the randomly obtained coordinates $(x_m, y_m, z_m)$ to the centers of one of the first to (m−1)th particles exceeds the value $\Phi+d$, the coordinates $(x_m, y_m, z_m)$ of the center and the diameter for the particle are reobtained by using other uniform and normally distributed random numbers and the equations (1) and (4) until the distances from the center of the mth particle based on the randomly obtained coordinates $(x_m, y_m, z_m)$ to the centers of all of the first to (m−1)th particles become equal to or smaller than the value $\Phi+d$. In this case, when the value d is decreased, the particles are more densely dispersed or coagulated in the calculation model 200.

(c) It is possible to produce a calculation model 200 of an arrangement in which particles having a shape other than the spherical shape are distributed. At this time, it is possible to add parameters indicating the shape and orientation of the particles to the aforementioned parameters to be inputted through the screen.

(d) It is possible to produce a plurality of calculation models which are produced by using different sequences of random numbers, perform analysis of electromagnetic fields by using the respective calculation models by the electromagnetic analysis unit 20, and obtain an average of the calculation results based on the plurality of calculation models. Generally, when an electromagnetic field is analyzed by using a calculation model randomly produced based on a sequence of random numbers, the calculation result contains variations which depend on the sequence of random numbers. However, when the calculation results based on the plurality of calculation models using different sequences of random numbers are averaged, it is possible to reduce the variations caused by the respective sequences of random numbers.

(e) Although the particles of only one type are distributed in a predetermined analytical space according to the explained embodiment, alternatively, it is possible to produce a calculation model of an arrangement in which a plurality of types of particles are distributed. In this case, the amount of each type of particles distributed in the analytical space should be set, and the plurality of types of particles should be distributed so that the volumes of the plurality of types of particles do not overlap each other.

Advantages

As explained above, according to the present invention, when the distribution-index value indicating the amount of particles distributed in a predetermined space is inputted into the electromagnetic analysis apparatus, the electromagnetic analysis apparatus automatically produces a calculation model of an arrangement in which the particles are distributed. Therefore, it is possible to produce a calculation model without manually setting the positions of a great number of particles by CAD or the like, and easily produce or change the calculation model for analyzing the electromagnetic field.

Other Matters

The electromagnetic analysis apparatus according to the present invention can be realized by a computer. Specifically, a program (i.e., an electromagnetic analysis program) describing details of the processing which realizes the functions of the electromagnetic analysis apparatus is provided. When the computer executes the program, the functions of the electromagnetic analysis apparatus can be realized on the computer.

The electromagnetic analysis program describing the details of the processing can be stored in a computer-readable medium (i.e., a recording medium which can be read by the computer). The computer-readable medium is not limited to any specific type of storage devices and includes any kind of devices, including but not limited to CDs, floppy disks, RAMs, ROMs, hard disks, magnetic tapes, and internet downloads, in which computer instructions can be stored and/or transmitted. Transmission of computer codes through a network or through wireless transmission means is also within the scope of this invention. Additionally, computer codes/instructions include, but are not limited to, source, object, and executable codes and can be written in any language including higher level languages, assembly languages, and machine languages.

What is claimed is:

1. An apparatus for analyzing an electromagnetic field in an analytical space, comprising:
at least one processor operating as:
a range setting unit for setting a range of said analytical space;
an object-information setting unit for setting a distribution-index value indicating an amount of particles distributed in said range, dimensions of the particles, a first material-property value of a first material of which the particles are formed, and a second material-property value of a second material existing around the particles in the range;
a model production unit which produces a calculation model of an arrangement in which said particles are arranged at random positions in said range so as to realize said distribution-index value, said dimensions of the particles, said first material-property value, and said second material-property value which are set by said object-information setting unit; and an analysis unit which analyzes said electromagnetic field in said range in accordance with said calculation model.

2. An apparatus according to claim 1, wherein said model production unit determines said random positions by using values generated on the basis of random numbers.

3. An apparatus according to claim 1, wherein said model production unit includes a distance input unit for inputting a reference value for distances between said particles, and arranges the particles so that the distances between at least part of said particles are increased on the basis of the reference value.

4. An apparatus according to claim 2, wherein said model production unit includes a distance input unit for inputting a reference value for distances between said particles, and arranges the particles so that the distances between at least part of said particles are increased on the basis of the reference value.

5. An apparatus according to claim 1, wherein said model production unit includes a distance input unit for inputting a reference value for distances between said particles, and arranges the particles so that the distances between at least part of said particles are decreased on the basis of the reference value.

6. An apparatus according to claim 2, wherein said model production unit includes a distance input unit for inputting a reference value for distances between said particles, and arranges the particles so that the distances between at least part of said particles are decreased on the basis of the reference value.

7. An apparatus according to claim 1, wherein said first material-property value indicates a refractive index of said first material, and said second material-property value indicates a refractive index of said second material.

8. An apparatus according to claim 2, wherein said first material-property value indicates a refractive index of said first material, and said second material-property value indicates a refractive index of said second material.

9. An apparatus according to claim 3, wherein said first material-property value indicates a refractive index of said first material, and said second material-property value indicates a refractive index of said second material.

10. An apparatus according to claim 4, wherein said first material-property value indicates a refractive index of said first material, and said second material-property value indicates a refractive index of said second material.

11. An apparatus according to claim 5, wherein said first material-property value indicates a refractive index of said first material, and said second material-property value indicates a refractive index of said second material.

12. An apparatus according to claim 6, wherein said first material-property value indicates a refractive index of said first material, and said second material-property value indicates a refractive index of said second material.

13. A non-transitory computer-readable medium storing a program to be executed by a computer for analyzing an electromagnetic field in an analytical space, said program realizing in the computer:

a range setting unit for setting a range of said analytical space;

an object-information setting unit for setting a distribution-index value indicating an amount of particles distributed in said range, dimensions of the particles, a first material-property value of a first material of which the particles are formed, and a second material-property value of a second material existing around the particles in the range;

a model production unit which produces a calculation model of an arrangement in which said particles are arranged at random positions in said range so as to realize said distribution-index value, said dimensions of the particles, said first material-property value, and said second material-property value which are set by said object-information setting unit; and an analysis unit which analyzes said electromagnetic field in said range in accordance with said calculation model.

* * * * *